Nov. 16, 1926.

A. BADOWSKI 1,606,740

TIRE STEM PRESSURE GAUGE

Filed Oct. 19, 1921

Alfred Badowski
Inventor

By

Attorney.

Patented Nov. 16, 1926.

1,606,740

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

TIRE-STEM PRESSURE GAUGE.

Application filed October 19, 1921. Serial No. 508,731.

Pressure gauges have been provided for pneumatic tires which have been arranged in valve stems. Such gauges having a movable plunger indicating by its movement the inflation pressure. The plunger is provided with an inflation passage and in order to extend the communication from this passage in the plunger to the tube it has been necessary or desirable to supply an extensible tube. Ordinarily this has been provided by an elastic tube which is subjected to constant stretching while the tire is under inflation. With the present invention the tube while extensible is formed of non-elastic or non-extensible material and thus readily sustains the inflation pressure which is largely circumferential and still extensible to take care of the movement of the plunger. The invention also relates to a means of attaching the tube to the plunger.

The invention is illustrated in the accompanying drawings as follows:—

Figure 1:
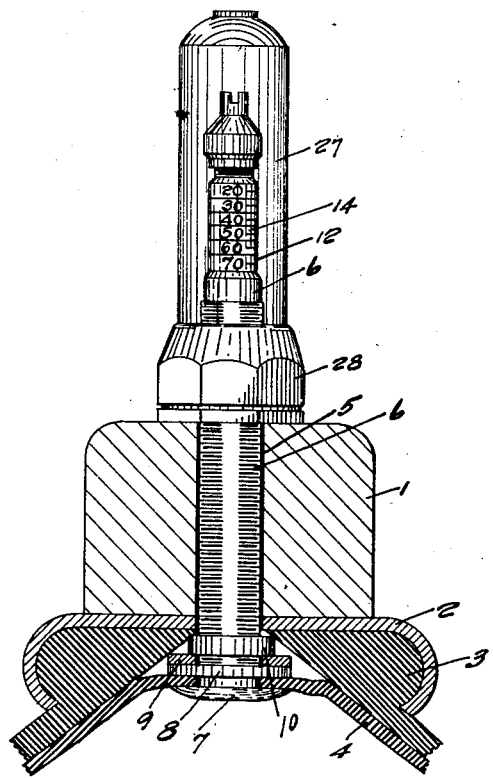

Fig. 1 shows a section of a felloe with the pressure gauge in place.

Figure 2:
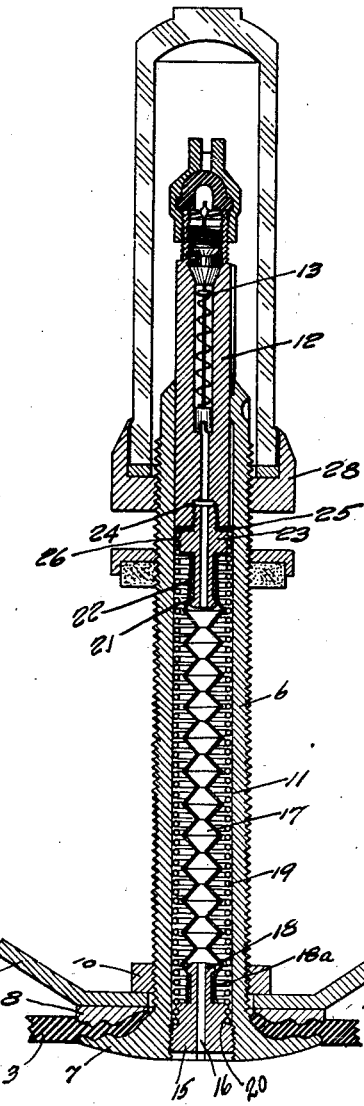

Fig. 2 a central vertical section through the pressure gauge.

1 marks the felloe, 2 the rim on the felloe, 3 a tire in place on the rim, 4 an inner tube of a tire, and 5 an opening through the felloe through which the inflation stem extends.

The stem or sleeve 6 is provided with a head 7. The tube is clamped between this head and a washer 8. The usual separating plate 9 is provided and a clamping nut 10 is arranged on the stem.

The stem has an opening 11 extending through it and the plunger 12 is slidingly mounted in this opening. The plunger has an inflation passage extending through it in which is arranged the inflation valve 13. A scale 14 is also arranged on the plunger the scale indicating the inflation pressure to which the plunger is subjected.

An anchor plug 15 is screwed into the inner end of the opening. It is provided with a passage 16.

An extensible tube 17 extends over a nipple 18 on the anchor plug and is secured by a wrapping 18ª. This tube is preferably formed of silk or leather, practically non-extensible within itself under the pressures to which it is subjected and it is given an accordion form so that while it resists the circumferential extension it is free to extend axially. A spring 19 is also secured to the anchor plug 15, the anchor plug being provided with screw threads 20 for this purpose.

The upper end of the tube extends over a nipple 21 and is secured thereto by a wrapping 22. The nipple is formed on a securing piece 23 having a screw-threaded end which is screwed into a screw-threaded socket 24 in the plunger. The securing piece has a passage through it forming the extension of the passage in the plunger and a gasket 25 is arranged between the end of the plunger and the securing piece. The outer periphery of the securing piece is screw-threaded at 26 and the spring 19 is secured to the securing piece by being screwed on to these threads. A transparent cap 27 is secured in a base 28 and the base is screwed on to the stem 6.

What I claim as new is:—

1. In a tire stem pressure gauge, the combination of a sleeve; a plunger in the sleeve indicating by its movement the inflation pressure in the sleeve; a detachable securing piece on the plunger; an extensible tube secured to said piece and forming a means of communication leading from the plunger to a stationary part of the sleeve; and a spring secured to said piece and resisting the movement of the plunger.

2. In a tire stem pressure gauge, the combination of a sleeve; a plunger in the sleeve indicating by its movement the inflation pressure in the sleeve; a detachable tube securing piece having a screw-threaded end screwed into the end of the plunger; an extensible tube secured to said piece and forming a means of communication leading from the plunger to a stationary part of the sleeve; and a spring secured to said piece and resisting the movement of the plunger.

3. In a tire stem pressure gauge, the combination of a sleeve; a plunger in the sleeve indicating by its movement the inflation pressure in the sleeve; a detachable tube securing piece on the plunger; an extensible tube within the sleeve formed of non-elastic material secured to said piece and forming a means of communication leading from the plunger to a stationary part of the sleeve; and a spring secured to said piece and resisting the movement of the plunger.

In testimony whereof I have hereunto set my hand.

ALFRED BADOWSKI.